No. 844,761. PATENTED FEB. 19, 1907.
F. B. TYSON.
GEARING.
APPLICATION FILED APR. 20, 1906.
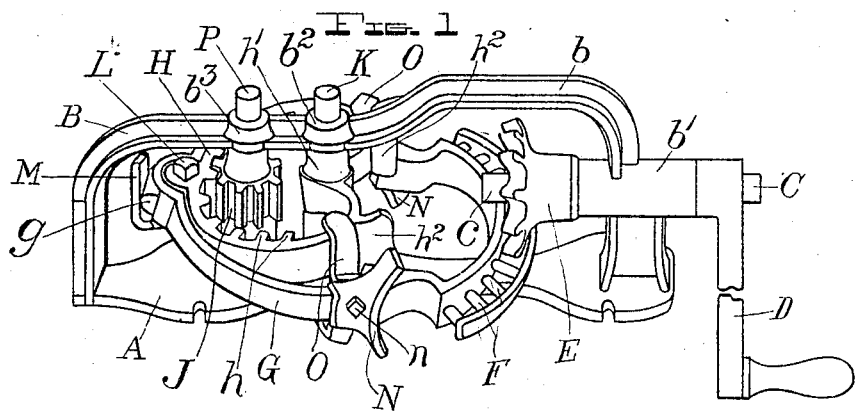
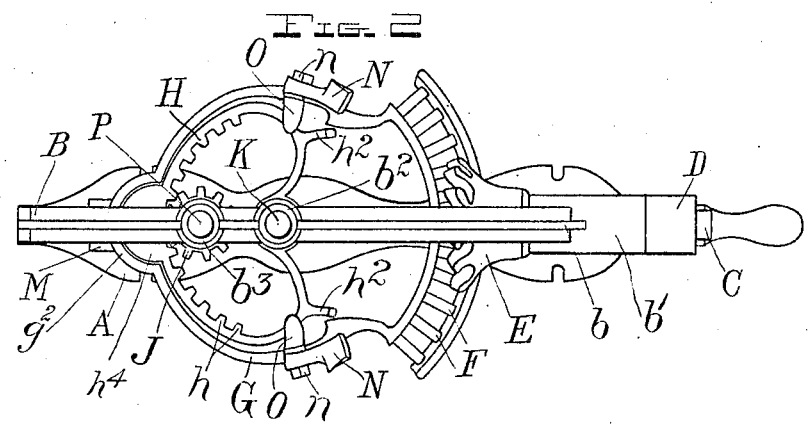
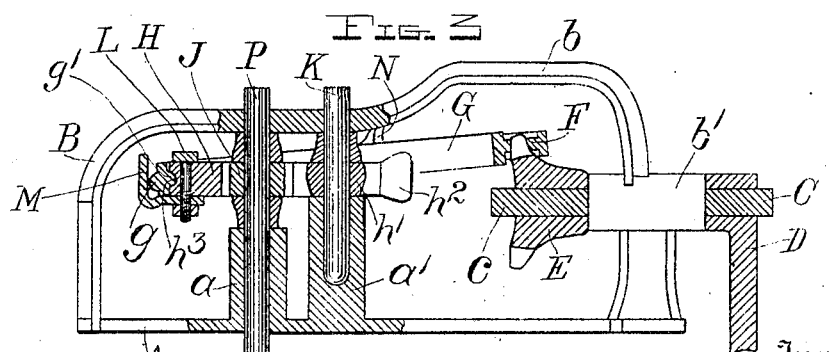
Witnesses
Louis Greenberg
Richard C. Palinger
Inventor
Frank B. Tyson,
By Harvey Spalding and Sons.
Attorneys.

UNITED STATES PATENT OFFICE.

FRANK B. TYSON, OF RANDOLPH, KANSAS.

GEARING.

No. 844,761.  Specification of Letters Patent.  Patented Feb. 19, 1907.

Application filed April 20, 1906. Serial No. 312,813.

*To all whom it may concern:*

Be it known that I, FRANK B. TYSON, a citizen of the United States, residing at Randolph, in the county of Riley and State of Kansas, have invented certain new and useful Improvements in Gearing, of which the following is a specification.

My invention relates to gearing, and belongs directly to that class of mechanical movements which comprise an alterating rotary shaft driven by a pinion in engagement with a vibratory rack that is itself operated by another rack pivotally connected with the first rack and actuated by a pinion upon a crank-shaft which furnishes the original source of motion. The crank-shaft and pinion turn always in the same direction, and the pivoted rack is arranged to rise and be moved by the pinion in one direction and to fall and be moved by the same pinion in the opposite direction.

My invention consists in the special construction of parts and their particular arrangement for carrying out the movement common to these mechanisms, and I accomplish my object by fashioning and associating the parts substantially as illustrated in the accompanying drawings, of which—

Figure 1 represents a side perspective view of all the parts assembled. Fig. 2 is a top plan view. Fig. 3 is a side view in section, showing the pivotal rack in its raised position with respect to the pinion on the crank-shaft.

Like letters refer to the same parts throughout.

Upon a suitable base-plate A there is formed integrally a curved frame B, bridging the plate from end to end and having a raised portion $b$ at the right-hand end. At this end is also formed the bearing $b'$, and toward the left there are provided the bearings $b^2$ and $b^3$, all to be again mentioned.

The crank-shaft, which is the operating-shaft, is marked C, and its left-hand extremity is designated $c$. The crank is referred to by letter D. In Figs. 1 and 3 it will be noted that the end $c$ of the crank-shaft projects beyond the pinion E, which is driven by shaft C.

The pinion E meshes with a rack F, formed exteriorly on an extension of the circular pivotal frame G. The end of frame G which is formed into the rack F is free to rise and fall, while the other end of frame G is in pivotal connection with a vibratory heart-shaped rack H. The extreme end of rack-frame G is formed into a semicylindrical nose $g$, to be again mentioned.

The heart-shaped rack H possesses the teeth $h$, a hub $h'$, the twin projecting ears $h^2$, (best shown in Figs. 1 and 2,) and the horizontal transverse groove $h^3$ at the left-hand end, where rack H and rack-frame G come together. At this point the frame G is provided with a rounded ridge $g'$, corresponding to and fitting movably in the groove $h^3$ of the heart-shaped rack H. Thus the frame G may rock up and down with respect to rack H. The teeth of rack H engage pinion J, as shown in all the figures. The hub $h'$ of rack H constitutes its center of movement, with the vertical stub-shaft K for an axis. Stub-shaft K is upheld in a socket-bearing $a'$, which forms part of the base-plate A, as best illustrated in Fig. 3.

The letter L refers to a bolt by which an angular keeper M is secured to the left-hand semicircular end $h^4$ of the heart-shaped rack H. The office of the keeper M, as will be readily understood from inspection of Fig. 3, is to prevent the separation of rack-frame G and rack H and to keep the rounded ridge $g'$ in the transverse groove $h^3$, whereby the rack-frame G may rise and fall with respect to the horizontally-vibratory rack H, as explained, with displacement. Attention is here called to the engagement of the semi-annular left-hand extension $g^2$ of rack-frame G and the semicircular end $h^4$ of rack H. By that enengagement lateral displacement of these ends is prevented with respect to each other.

The rack-frame G is provided with two curved shaft-end guides N, and the bolts $n$ secure those guides to the rack-frame G and at the same time serve to secure the C-shaped stops O upon the inside of rack-frame G. As appears in Fig. 2, there are two each of the shaft-end guides N and the C-shaped stops O.

The washing-machine shaft P is operated by the pinion J in the usual manner. The upper end of the stub-shaft K is held in the bearing $b^2$ of frame B, and the upper end of shaft P is held in bearing $b^3$ of that frame. The shaft P passes downwardly through the vertical bearing $a$, formed upon the base-plate A, as shown in Fig. 3.

In the operation of my invention the crank-shaft is turned in one direction, and when the pinion E reaches the end of the rack F the end $c$ of the crank-shaft, described as projecting inwardly beyond the pinion and shown in Figs. 1 and 3, comes into contact with one of the shaft-end guides N. The rack F is therefore prevented from moving farther in the direction in which it was going, but does not leave its engagement with the pinion E. The result is that the rack is raised by the pinion, and where it formerly was moving below that pinion it now starts in motion above the pinion and in contrary direction. An alternating movement is thus given the rack-frame G and transmitted to rack H, which, it is believed to be clear, rotates the pinion J first in one direction and then in the other. It will be seen, further, that the pinion makes a whole revolution each way. As the rack-frame G rises and falls its said movement is limited and stopped by the contact of the C-shaped stops O with the rack H, and when the lateral movement of the rack-frame G begins the contact of the interior of the frame G at its narrowest part alternately with the ears $h^2$ of the heart-shaped rack H aid in giving the desired movement to that rack without straining any of the parts, thus enabling more movement and greater speed to be obtained.

Having thus described my invention and explained the mode of its operation, what I claim is—

1. In washing-machine mechanism, the combination with a frame arranged to be partly rotated horizontally and alternately in opposite directions, the said frame having one end provided with a rack and movable up and down, a pinion engaging the said rack and arranged to operate the said frame, a rack arranged within the said frame and rotatable horizontally, the said frame and rack having ends pivotally and movably engaged whereby the said frame is movable horizontally with respect to said rack and into contact with it to rotate the rack, means for limiting the up and down movements of the end of said frame, and devices constructed to limit the horizontal movements of said frame, substantially as described.

2. In washing-machine mechanism, the combination with a frame arranged to be partly rotated horizontally and alternately in opposite directions, the said frame having one end provided with a rack and movable up and down, a pinion engaging the said rack and arranged to operate the said frame, a rack arranged adjacent to the said frame, the said frame and rack having portions pivotally and movably engaged whereby the said frame is movable horizontally with respect to said rack, the said rack having projecting portions arranged in the path of the frame whereby the horizontal movement of the frame is impressed upon the rack, means for limiting the up and down movements of the frame, and devices constructed to limit the horizontal movements of the said frame, substantially as described.

3. In washing-machine mechanism, the combination with a frame arranged to be partly rotated horizontally and alternately in opposite directions, the said frame having one end provided with a rack and movable up and down, a pinion engaging the said rack and arranged to operate the said frame, a rack arranged within the said frame, the said frame and rack having portions pivotally and movably engaged whereby the said frame is movable horizontally with respect to the said rack, the said rack having projecting portions relatively wider than the remaining portions of the rack and arranged in the path of the said frame whereby the horizontal movements of the frame are impressed upon the said rack, means for limiting the up and down movements of the frame, and devices constructed to limit the horizontal movements of the said frame, substantially as described.

4. In washing-machine mechanism, the combination with a frame arranged to be partly rotated horizontally and alternately in opposite directions, the said frame having one end provided with a rack and movable up and down, a pinion engaging the said rack and arranged to operate the said frame, a rack arranged within the said frame, the said frame and rack having horizontally-movable ends engaging each other whereby the said frame is movable up and down and horizontally with respect to the said rack, the said rack having projecting portions relatively wider than the remaining portions of the rack and arranged in the path of the said frame whereby the horizontal movements of the frame are impressed upon the said rack, means for limiting the up and down movements of the frame, and devices constructed to limit the horizontal movements of the said frame, substantially as described.

In testimony whereof I affix my signature in presence of two witnesses.

FRANK B. TYSON.

Witnesses:
C. A. ROBERTS,
A. S. EKDAHL.